United States Patent [19]

Brenig et al.

[11] 3,922,493

[45] Nov. 25, 1975

[54] COMMUNICATION SYSTEM USING TIME-DIVISION MULTIPLEXING AND PULSE-CODE MODULATION

[75] Inventors: Theodore Brenig; Robert T. Gordon, both of Lynchburg, Va.

[73] Assignee: General Electric Company, Lynchburg, Va.

[22] Filed: Feb. 1, 1971

[21] Appl. No.: 111,436

[52] U.S. Cl...... 179/15 AP; 179/15 BY; 179/15 AL

[51] Int. Cl.² ........ H04J 3/04

[58] Field of Search.. 325/38 A; 179/15 AP, 15 BY, 179/15 AL

[56] References Cited

UNITED STATES PATENTS

| | | | |
|---|---|---|---|
| 3,217,316 | 11/1965 | Trampel | 325/38 A |
| 3,274,611 | 9/1966 | Brown | 325/38 A |
| 3,344,352 | 9/1967 | Daevet | 325/38 A |
| 3,414,677 | 12/1968 | Quinlan | 325/38 A |
| 3,518,662 | 6/1970 | Nakagome | 325/38 A |
| 3,519,750 | 7/1970 | Beresin | 179/15 AL |
| 3,529,089 | 9/1970 | Davis | 179/15 AL |

OTHER PUBLICATIONS

*Bell Laboratories Record*, January 1949, "Timing Control for PCM" by A. E. Johanson, pp. 10–15.

*Transmission Systems for Communications*, Bell Telephone Laboratories, Feb. 1970, pp. 627–630.

*Digital Communications*, RCA Institute, Third Edition, 1968, pp. 3.23 –3.24.

*Primary Examiner*—Kathleen H. Claffy

[57] ABSTRACT

Thirty-six voice channels and their accompanying signalling are provided (over one pair of wires or one circuit for each direction of transmission) using time-division multiplexing and pulse-code modulation. The voice channels are carried by 36 respective channels, and the signalling is carried by a 37th channel which also provides alarm and framing information. The amplitude of each of the 36 voice channels is sequentially sampled and time-division multiplexed. Each voice sample is encoded as seven binary pulses. Binary signalling pulses are then time-division multiplexed after each frame of pulses for the 36 voice channels. Each successive group of four binary pulses is converted into a group of three ternary pulses at a reduced frequency for transmission. At the receiver, the ternary pulses are converted back to binary pulses which are then decoded and demultiplexed to respective voice and signalling channels.

20 Claims, 6 Drawing Figures

INVENTORS:
THEODORE BRENIG,
ROBERT T. GORDON,

BY James J. Williams
THEIR ATTORNEY.

FIG.3

BINARY–TERNARY (4–3) CONVERSION CODE

| BINARY GROUP | TERNARY GROUP | | POLARITY WEIGHT |
|---|---|---|---|
| | POSITIVE MODE | NEGATIVE MODE | |
| 0000 | 0 + 0 | 0 − 0 | 1 |
| 0001 | + 0 0 | − 0 0 | 1 |
| 0010 | + − 0 | + − 0 | 0 |
| 0011 | − + 0 | − + 0 | 0 |
| 0100 | 0 + − | 0 + − | 0 |
| 0101 | + + + | − − − | 3 |
| 0110 | + − + | − + − | 1 |
| 0111 | − 0 + | − 0 + | 0 |
| 1000 | 0 0 + | 0 0 − | 1 |
| 1001 | − + + | + − − | 1 |
| 1010 | + + 0 | − − 0 | 2 |
| 1011 | 0 + + | 0 − − | 2 |
| 1100 | + 0 − | + 0 − | 0 |
| 1101 | + 0 + | − 0 − | 2 |
| 1110 | + + − | − − + | 1 |
| 1111 | 0 − + | 0 − + | 0 |

POSITIVE MODE IS USED IF PRIOR NET POLARITY WEIGHT IS NEGATIVE.
NEGATIVE MODE IS USED IF PRIOR NET POLARITY WEIGHT IS ZERO OR POSITIVE.

INVENTORS:
THEODORE BRENIG,
ROBERT T. GORDON,
BY James L. Williams
THEIR ATTORNEY.

INVENTORS:
THEODORE BRENIG,
ROBERT T. GORDON,
BY James L. Williams
THEIR ATTORNEY.

INVENTORS:
THEODORE BRENIG,
ROBERT T. GORDON,

BY James L. Williams
THEIR ATTORNEY.

COMMUNICATION SYSTEM USING TIME-DIVISION MULTIPLEXING AND PULSE-CODE MODULATION

BACKGROUND OF THE INVENTION

Our invention relates to a communication system using timedivision multiplexing and pulse-code modulation, and particularly to such a system that provide 36 voice channels having the same quality and within the same overall bandwidth as present 24-channel systems which use time-division multiplexing and pulse-code modulation.

Communication systems using time-division multiplexing and pulse-code modulation are used to provide a plurality of relatively low-noise, easily regenerated communication channels over a single communication circuit. As pointed out in a book entitled "Transmission Systems for Communications", by Members of the Technical Staff, Bell Telephone Laboratories, 4th Edition, 1970, telephone companies use such systems extensively for local transmission in large cities. One such system, designated the T1 System for the Bell Telephone System, provides 24 voice channels over two pairs of wires (one pair of wires for each direction of transmission) at a rate of 1.544 million pulses per second. While such a system provides good utilization of existing cable pairs, it still does not meet the demands for telephone service, particularly in the large cities of the United States. In order to meet these demands for telephone service, telephone companies are now considering the addition of more cables to provide additional circuits. Such additional cables represent a large financial outlay, and in some cities are almost out of the question, because of the congestion and limited space for such cables, and the resultant high construction costs.

Accordingly, a primary object of our invention is to devise a new and improved communication system using time-division multiplexing and pulse-code modulation that provides an increased number of individual channels which can be transmitted and received over two pairs of wires or over two circuits.

A more specific object of our invention is to provide a new time-division multiplex, pulse-code modulation system that has the same line pulse rate and desirable qualities as the 24-channel Bell Telephone T1 System, but that transmits and receives 36 voice channels (or their equivalent) over two pairs of wires or over two circuits.

A more general object of our invention is to provide a communications system that provides more channels than the Bell Telephone T1 System without the necessity of a greater line pulse rate and without appreciable loss in transmission quality.

Various time-division multiplex, pulse-code modulation systems are discussed by H. Geissler in an article entitled "Planning PCM Systems for PTT Communication Networks", *Nachrichtentechnische Zeitschrift*, Nov. 11, 1967, pages 667–684 (published by VDE Verlag GMBH, Berlin, Germany). However, each of the systems described in that article has some disadvantage, such as relatively large bandwidth requirements, an insufficient number of voice channels, or a preference that all channels be equal in length or have the same number of pulses. Some of the problems in digital transmission are discussed by K. W. Cattermole in a paper entitled "problems and Opportunities in Digital Transmission", *IEEE International Convention Record*, Mar. 18–21, 1968, page 239. In his discussion, Cattermole suggests a more efficient ternary line code, but does not provide the system needed to meet the demands for increased telephone service.

Therefore, another object of our invention is to provide a new time-division multiplex, pulse-code modulation system that has relatively low pulse rate requirements, that provides a relatively large number of voice channels (or their equivalent), and that has what we believe to be an optimum selection of the number and arrangement of bits to multiplex the 36 voice channels provided by our system.

SUMMARY OF THE INVENTION

Briefly, these and other objects are achieved in accordance with our invention by a system which uses time-division multiplexing and pulse-code modulation of 36 channels for voice and a separate 37th channel for signalling, alarms, and framing. Each of the 36 voice channels is amplitude-sampled 8,000 times per second, and the samples are time-division multiplexed. The amplitude of each of the multiplexed samples is then encoded by seven binary pulses. Five binary pulses representing signalling, alarms, and framing are multiplexed after each 252 pulses (36 voice channels times 7 pulses per channel) to complete one frame comprising 257 pulses. Twelve such frames comprise a super frame that represents 12 amplitude samples of each of the 36 voice channels; one sample of each of the signals for the 36 channels; and also the alarm and framing signals. The binary pulses occur at a rate of 2.056 million pulses per second, and are applied to a binary-to-ternary converter which reduces the pulse rate by one fourth to 1.542 million pulses per second for transmission over the communication circuit or pair of wires. At the receiver, the ternary pulses are converted back to binary pulses at the original rate of 2.056 million pulses per second. These binary pulses are then decoded and demultiplexed to the respective voice channels. Thus, we provide an improved communication system using time-division multiplexing and pulse-code modulation to provide 36 voice channels within a line rate of 1.542 million pulses per second, but without a reduction in voice quality or signal-to-noise ratio.

BRIEF DESCRIPTION OF THE DRAWING

The subject matter which we regard as our invention is particularly pointed out and distinctly claimed in the claims. The structure and operation of our invention, together with further objects and advantages, may be better understood from the following description given in connection with the accompanying drawing, in which;

FIG. 3 shows a table giving the binary-ternary conversion code;

DESCRIPTION OF THE PREFERRED EMBODIMENT

In the following description, we will first give a general description of our time-division multiplex, pulse-code modulation system and code, then give a detailed description of our system and code, and finally give a description of our system operation.

GENERAL DESCRIPTION OF SYSTEM AND CODE

In the description which follows, we describe our invention for use with 36 voice channels. However, it is to be understood that almost any type of information can be transmitted by the 36 channels. Since a typical voice channel for telephone use has an upper frequency limit of about 4,000 Hertz, we have, in accordance with good engineering practice, selected an amplitude sampling rate of twice this, or 8,000 Hertz or pulses per second. Such a sampliing rate insures reasonably good fidelity and quality for ordinary telephone conversation. Also, such a sampling rate is compatible with Bell System practices so that our system can be used for digital multiplexing and digital switching applications. As pointed out earlier, we provide 36 voice channels and one signalling, alarm, and framing channel. In order to provide good representation of each voice channel amplitude sample, we prefer recognition of 128 different quantizing steps or amplitude levels. In binary code, 128 different amplitude levels require seven digits or bits. The first bit is the most significant and represents an amplitude level of 64. This bit is followed by the second through the sixth bits which respectively represent amplitude levels of 32, 16, 8, 4, and 2. The seventh bit is the least significant, and represents an amplitude level of 1. The 37th channel for signalling, alarm, and framing, comprises five bits. With these specifications, 8,000 samples/channel-second multiplied by 7 bits/sample multiplied by 36 channels (or 2,016,000 pulses or bits per second) plus 8,000 samples/channel-second multiplied by 5 bits/-sample multiplied by 1 channel (or 40,000 pulses or bits per second) are required. This is a total of 2,056,000 or 2.056 million pulses per second. Hence the required basic clock or pulse-rate frequency is 2.056 million pulses per second.

Figure 1:
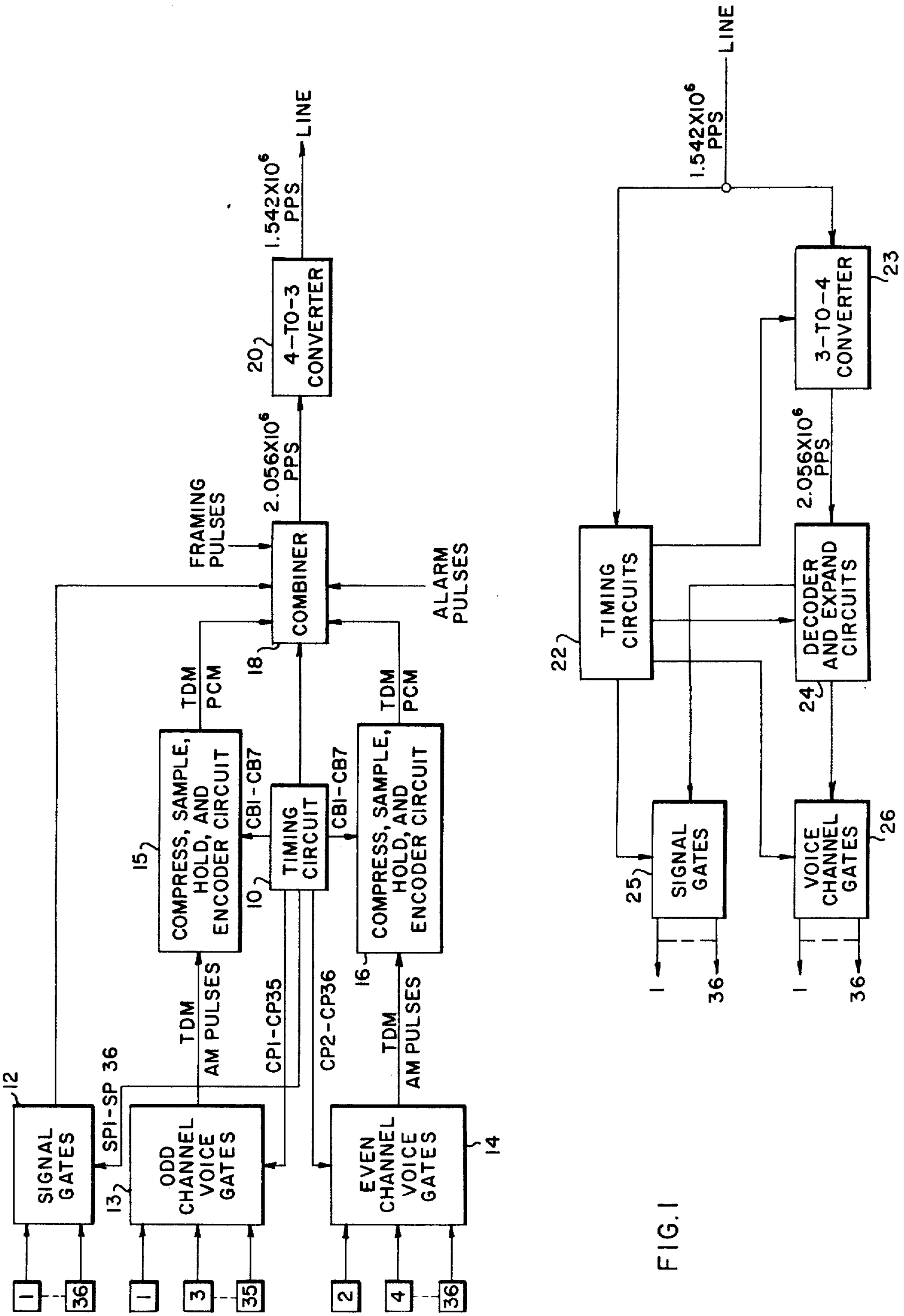
FIG. 1 shows a general block diagram of a time-division multiplex, pulse-code modulation transmitter and receiver in accordance with our invention.

With reference to FIG. 1, we provide a timing circuit 10 which supplies the basic clock or pulse frequency of 2.056 million pulses per second. In addition, the timing circuit 10 supplies other timed signals, including the following;

- Signalling pulses SP1 through SP36 for operating the 36 signal gates 12
- Channel pulses CP1 through CP36 for operating the odd and even channel voice gates 13, 14
- Framing pulses FP1 through FP12 for indicating each of the 12 frames of a super frame
- Channel bits CB1 through CB7 for indicating each of the 7 bits which encode the voice channels or each of the 5 bits which encode the signalling, alarm, and framing channel.

The signals, such as dialing or other information, are applied to the signal gates 12, and are gated thhrough at an appropriate time by the signal pulses SP1 through SP36 to a combiner 18 for multiplexing. Since a relatively long time is required to encode each of the voice channels, we have included two voice gates 13, 14, these being respectively designated the odd-channel voice gates 13 and the even-channel voice gates 14. These gates 13, 14 repetitively sample the information (amplitude) of the voice channels in sequence (1, 3, 5, etc. and 2, 4, 6, etc., respectively), each channel being sampled 8,000 times per second. The odd channels 1 through 35 are gated by the odd channel pulses CP1 through Cp35 and the odd-channel voice gates 13 to an odd compress, sample, hold, and encoder circuit 15. In a similar manner, the even channels 2 through 36 are gated by the even channel pulses CP2 through Cp36 and the even-channel voice gates 14 to an even compress, sample, hold, and encoder circuit 16. The signals applied to the circuits 15, 16 are time-division multiplex, amplitude-modulating pulses. In the circuits 15, 16, these pulses are compressed in accordance with conventional practice, to amplify or emphasize the lower signal amplitudes more than the higher signal amplitudes. However, it should be pointed out that such compression may be omitted. Each of the pulses is amplitude-sampled again, preferably at the end or during the last part of its respective first sample. EAch of these second amplitude samples is held in a suitable time-delay circuit, and then encoded or quantized. That is, the amplitude of the held sample is measured or compared with respect to a reference level, and this measured level is then indicated by the 7 binary bits. For example, if the encoder recognizes 128 different amplitude levels (between 0 and 127), and if a held pulse has a measured level of 93 for example, this held pulse would be encoded as: 1 0 1 1 1 0 1. In this code, the first (and most significant) bit is a 1 which represents 64. The second bit is a 0 which represents the absence of 32. The third bit is a 1 which represents 16. The fourth bit is a 1 which represents 8. The fifth bit is a 1 which represents 4. The sixth bit is a 0 which represents the absence of 2. And the seventh (and least significant) bit is a 1 which represents 1. The numbers represented by a 1 total 93. The combiner 18, utilizing various timed signals from the timing circuit 10, combines these time-division multiplexed, encoded bits in the proper sequence beginning with Channel 1, and ending with Channel 36. After the Channel 36 coded pulses, 5 bits or pulses (representing signalling and alarm or framing) are then combined to provide a frame of 257 bits or pulses. This frame is repeated 8,000 times per second so that 257 multiplied by 8,000 or 2.056 million pulses per second are produced by the combiner 18. These pulses are then applied to a 4-to-3 converter 20 which converts the coded binary pulses having two levels (namely a 0 or 1) to coded ternary pulses having three levels (namely plus, zero, and minus). In this conversion, each successive group of four binary pulses is converted to three ternary pulses. Thus, the frequency of the ternary pulses is three-fourths the frequency of the binary pulses, or 1.542 million pulses per second. These ternary pulses are applied to the circuit or line, which typically comprises a pair of wires in a cable.

At the receiver, the ternary pulses are derived from a circuit or line and applied to timing circuits 22 which reproduce the basic pulse or clock frequency of 2.056 million pulses per second as well as other timing signals for use by various parts of the receiver. The incoming ternary pulses (at a rate of 1.542 million pulses per second) are also applied to a 3-to-4 converter 23 which converts the ternary pulses back to corresponding binary pulses. In this conversion, each successive group of three ternary pulses (in the same grouping used or selected at the distant transmitter) is converted to four binary pulses. These binary pulses, which have a rate of 2.056 million pulses per second, are applied to decoder and expand circuits 24 which convert successive groups of seven binary pulses back to audio signals corresponding to the audio signals at the transmitter, and which expand the converted signals to compensate for the compression that took place at the transmitter. These expanded audio signals are then applied to voice channel gates 26 which, with signals from the timing circuits 22, demultiplex the audio signals back to their respective voice channels 1 through 36. The binary pulses of Channel 37 are supplied by the converter 23 to signal gates 25 which, with signals from the timing circuits 22, provide signals for the respective voice channels 1 through 36. In FIG. 1, we have shown the transmitter and receiver for only one terminal. Persons skilled in the art will appreciate that the transmitter of FIG. 1 would be used with a distant receiver, and that the receiver of FIG. 1 would be used with a distant transmitter. The distant transmitter and receiver would be respectively connected to the receiver and transmitter of FIG. 1 by two separate communication links, such as two pairs of wires.

Figure 2:
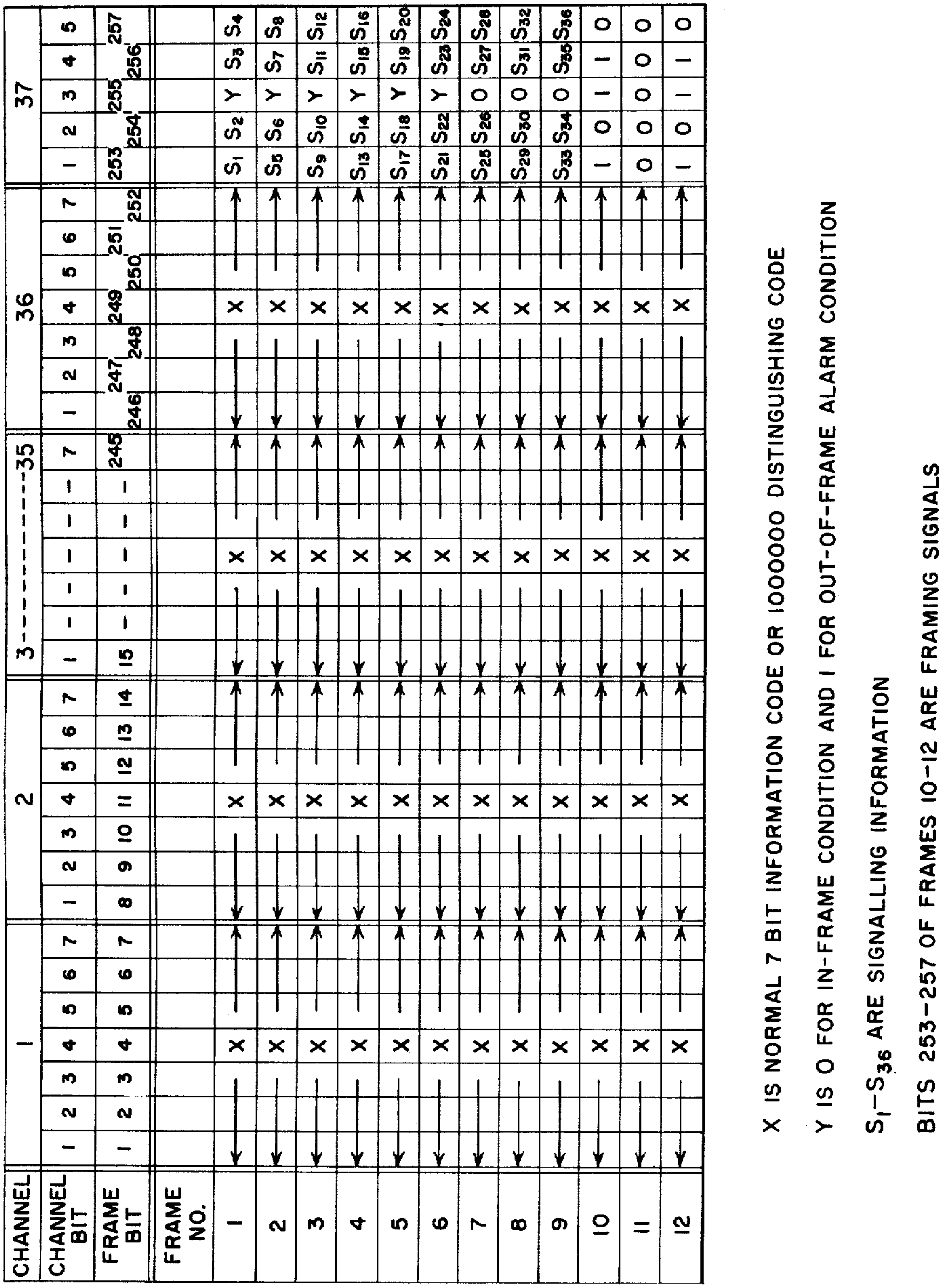
FIG. 2 shows a table giving the makeup of the 37 channels in each of the 12 frames forming a super frame.

FIG. 2 shows a table giving the makeup of the 37 channels in each of the 12 frames forming a super frame. In the top horizontal line, channels 1 through 37 are indicated. Since the makeup of the voice channels is the same, channels 3 through 35 are not shown in detail, as indicated by the dashed line. In the next horizontal line, the seven digits or bits needed to encode the sampled amplitude are indicated. It will be noted that each of the voice or information channels 1 through 36 comprises seven such digits or bits. The 37th channel (for signalling, alarm, and framing) comprises only five digits or bits. In the third horizontal line, the frame bit numbers are indicated for the channels. It should be noted that each frame comprises 257 bits; bits 1 through 252 are for the 36 voice channels, and bits 253 through 257 are for the signalling, alarm, and framing channel 37. Below the third line in the left-hand column, the frame numbers 1 through 12 are indicated. In the vertical columns under the voice channels, the bits are marked by an "X" which indicates that the bits may be either a 1 or a 0 in whatever combination is needed to encode amplitude levels 0 through 127. As will be explained in more detail subsequently, all of the 36 channels may have a 1 followed by six 0's in all 12 frames, if framing is needed. Channel 37 has a different makeup. Channel bit 3 of channel 37 or frame bit 255 is marked by a "y" for the first six frames. This Y is a 0 when the system is in frame, but is a 1 when the system is out of frame. Channel bit 3 of channel 37 (frame bit 255) of frames 7, 8, and 9 is preferably always 0. Channel bits 1, 2, 4 and 5 of channel 37 (frame bits 253, 254, 256, 257) of the first nine frames respectively indicate the signalling information for the 36 channels as indicated by the designation S1 through S36. These bits are either a 1 to indicate a signal, or a 0 to indicate no signal. We have found that only 1 bit per channel per super frame is needed in order to provide the necessary signalling, since a super frame is repeated every 1.5 milliseconds. This is shown by the following calculation:

$$\frac{257 \text{ pulses/frame} \times 12 \text{ frames/super frame}}{2{,}056{,}000 \text{ pulses/second}} = 1.5 \text{ milliseconds/super frame}$$

In frames 10, 11, and 12, bits 1 through 5 of channel 37 or frame bits 253 through 257 are used for system framing. These bits may have various logic sequences, but a preferred sequence is given in FIG. 2. The receiver is arranged with logic circuits so that if the selected framing logic sequence is not received in frames 10, 11, and 12 of channel 37, the receiver causes its local transmitter to send an alarm. This alarm is indicated by a 1 at the bits marked with a Y in FIG. 2. This 1 is sent to the distant terminal to cause the distant transmitter to send the distinguishing code of 1 0 0 0 0 0 0 continuously in all 36 voice channels. The framing code used in Channel 37, frames 10, 11, and 12, is therefore readily distinguishable from the voice channels, so that framing can be achieved in one super frame. Provision of a separate channel 37 for signalling, alarm and framing is an important feature of our invention in that it permits the 36 voice channels to have only voice information, and hence provides a high quality system of 36 voice channels with a line rate of 1.542 million pulses per second.

FIG. 3 shows the binary-ternary conversion code which is used. This code is used in the 4-to-3 converter 20 of the transmitter to convert binary bits or pulses to ternary bits or pulses; and is used in the 3-to-4 converter 23 in the receiver to convert ternary pulses back to binary pulses. As explained earlier, the pulses supplied by the combiner 18 in the transmitter are a stream of binary pulses having a rate of 2.056 million pulses per second. These binary pulses are placed in groups of four pulses, and each group of four binary pulses is converted to a corresponding group of three ternary pulses so that the line frequency is reduced. At the receiver, the ternary pulses are placed in the same corresponding groups of three, and each group of three ternary pulses is converted back to binary pulses in the same corresponding groups of four. In FIG. 3, the first vertical column shows binary groups of four pulses in all 16 possible combinations between four 0's and four 1's. In the next two vertical columns, the corresponding ternary groups of three pulses are shown. These next two columns show a positive mode and a negative mode, since it is desirable that the net polarity weight (i.e., positive and negative), remain as near zero as possible. This is to insure that any transformers in the communication link have as little direct current as possible applied to them. The positive mode is used if the prior net polarity weight is negative, and the negative mode is used if the prior net polarity weight is zero or positive. For example, a binary group of four 0's is converted to a ternary group of 0 + 0 in the positive mode, or 0 − 0 in the negative mode, depending upon what the net polarity weight was just prior to the appearance of that binary group of four 0's. If the prior net polarity weight was negaative, then the positive ternary mode of 0+ 0 would be used. If the prior net polarity weight was zero or positive, then the negative ternary mode of 0 − 0 would be used. The last vertical column shows the net polarity weight provided by each of ternary groups. Thus, for the binary group of four 0's, the ternary group has a polarity weight of 1 (either a plus or a minus, depending upon which mode is selected). At the receiver, the ternary groups are converted back to their corresponding binary groups as also indicated in FIG. 3. The conversion from binary groups to ternary groups for transmission on the line, and the conversion from ternary groups back to binary groups at the receiver is an important part of our invention, since it enables a relatively low pulse rate to be applied to the line and still provide 36 voice channels.

DETAILED DESCRIPTION OF SYSTEM AND CODE

Figure 4:
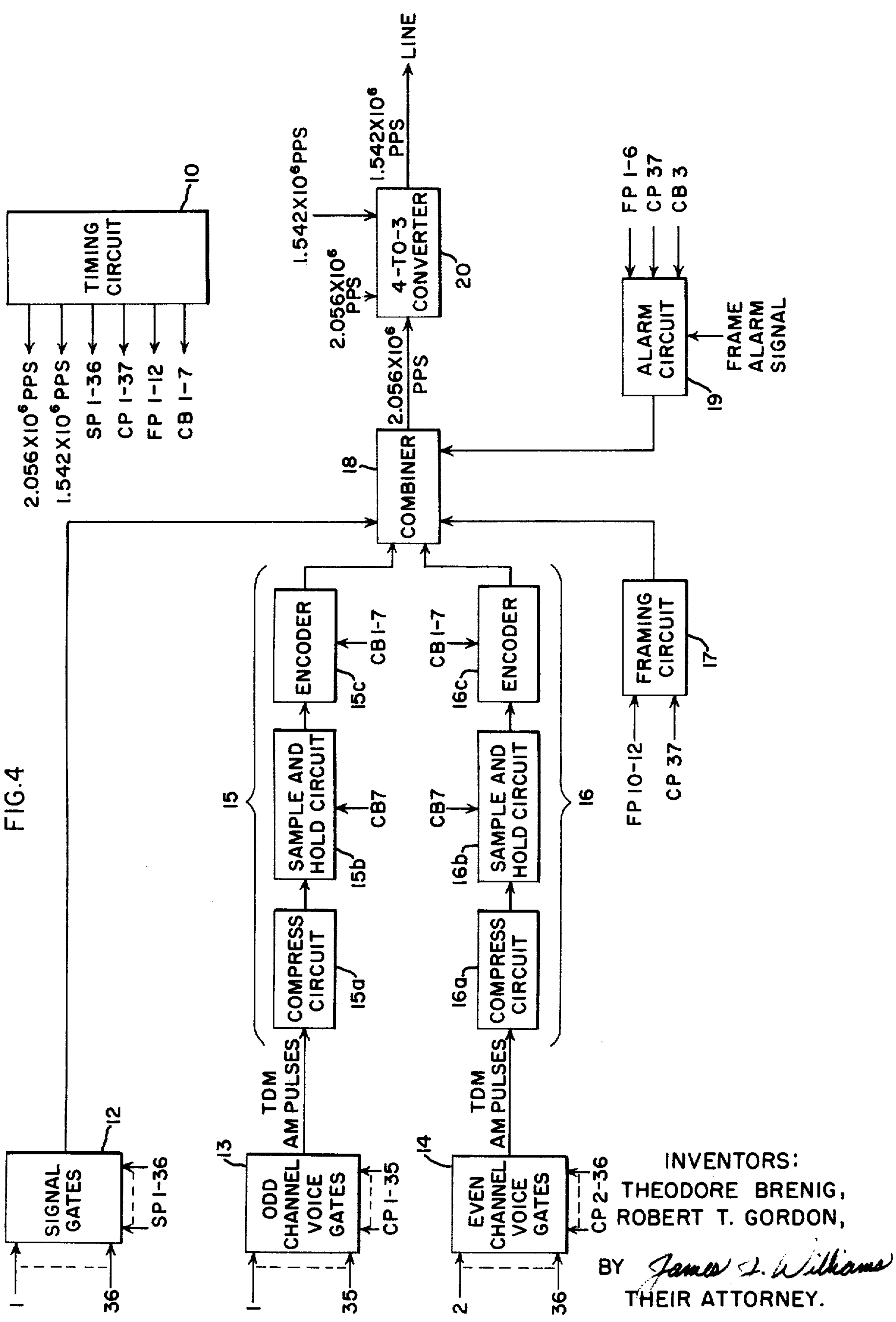
FIG. 4 shows a more detailed block diagram of the time-division multiplex, pulse-code modulation transmitter of FIG. 1.

In FIG. 4, we show a more detailed block diagram of a time-division multiplex, pulse-code modulation transmitter in accordance with our invention. The blocks of FIG. 4 have the same reference numerals as the corresponding blocks shown iin FIG. 1. The timing circuit 10 generates the indicated signals, namely: the 2.056 million pulses per second; the 1.542 million pulses per second, the signalling pulses SP-1 through SP-36 at the appropriate time in channel 37 of frames 1 through 9 (as shown in FIG. 2); the channel pulses CP-1 through CP-37 at the appropriate times and for the appropriate durations (as shown in FIG. 2); the frame pulses FP-1 through FP-12 at the appropriate times and for the appropriate durations (as shown in FIG. 2); and the individual channel bits CB-1 through CB-7 for channels 1 through 36 and CB-1 through CB-5 for channel 37 (as shown in FIG. 2). These pulses or signals are applied to the places indicated in the transmitter. Thus, the signal pulses SP-1 through SP-36 are applied to the signal gates 12 so as to sequentially gate the signal information for channels 1 through 36 to the combiner 18 at the appropriate time in channel 37 of frames 1 through 9. The odd channel pulses CP-1 through CP-35 are applied to the odd-channel voice gates 13 to gate the odd voice channels at the appropriate time; and the even channel pulses CP-2 through CP-36 are applied to the even channel voice gates to 14 to gate the even voice channels at the appropriate time. The voice channels are thus sequentially gated as time-division multiplex, amplitude-modulation pulses, and are applied to the compressor circuits 15*a*, 16*a* which, as explained, emphasize or increase the gain for low-amplitude signals relative to the high-amplitude signals. This has the effect of causing the low-amplitude signals to include more encoder steps and thereby make the encoding of these signals more correct. At the receiver, a corresponding decrease in gain of these low-amplitude signals must be provided to restore the signals to their original quality or condition. In the sample and hold circuits 15*b*, 16*b*, the compressed signals are sampled at the end of the compressed signal (such as by the channel bit CB-7), and this second sample is held for sufficient time so that it can be encoded. The encoders 15*c*, 16*c* measure the amplitude of the second sample, and encode this measured amplitude between 0 and 127 (0 represents the maximum negative amplitude; 64 represents zero amplitude; and 127 represents the maximum positive amplitude). The encoding is provided by the seven channel bits CB-1 through CB-7 which have numerical values or significances of 64, 32, 16, 8, 4, 2 and 1 respectively. The presence of a numerical value is indicated by a 1, and the absence of a numerical value is indicated by a 0. Each of the seven channel bits CB-1 through CB-7 for each of the channels 1 through 36 are sequentially applied to the combiner 18. After these bits for channels 1 through 36 (frame bits FB-1 through FB-252) are combined in sequence, they are followed by channel 37 bits CB-1 through CB-5 (frame bits FB-253 through FB-257). As explained earlier in connection with FIG. 2, Channel 37 has a varied makeup. Signalling information S-1 through S-36 for the 36 voice channels is provided during frame bits FB-253, FB-254, FB-256, and FB-257 of frames 1 through 9. Framing condition or alarm is provided during frame bit FB-255 of frames 1 through 6. Framing or synchronizing signals are provided during frame bits FB-253 through FB-257 of frames 10, 11, and 12. These signals of 1 0 1 1 0, 0 0 0 0 0, and 1 0 1 1 0 are provided by the framing circuit 17 in frames 10, 11, and 12 during the time of channel 37. The alarm circuit 19 is also connected to the combiner 18, and provides a signal designated Y at frame bit FB-255 of frames 1 through 6. If the receiver corresponding to the transmitter of FIG. 4 is in frame, no frame alarm signal is applied to the alarm circuit 19. Hence, the circuit 19 produces a 0 at frame bit FB-255 of frames 1 through 6. However, if the receiver is out of frame (i.e., does not receive 1 0 1 1 0, 0 0 0 0 0, and 1 0 1 1 0 in frames 10, 11, and 12 of channel 37), a frame alarm signal is applied to the alarm circuit 19. This causes the alarm circuit 19 to provide a 1 at frame bit FB-255 of frames 1 through 6. Thus, the combiner 18 produces a stream of pulses as shown in FIG. 2 at a rate of 2.056 million pulses per second. These pulses are applied to the 4-to-3 converter 20 which groups each sequence of four binary pulses and, in accordance with the code shown in FIG. 3, converts these groups of four binary pulses to groups of three primary pulses at a rate of 1.542 million pulses per second. These pulses are then applied to the line. As pointed out earlier, this enables us to provide 36 voice channels in the same pulse rate required by the Bell Telephone T1 System, but which provides only 24 voice channels.

Figure 5:
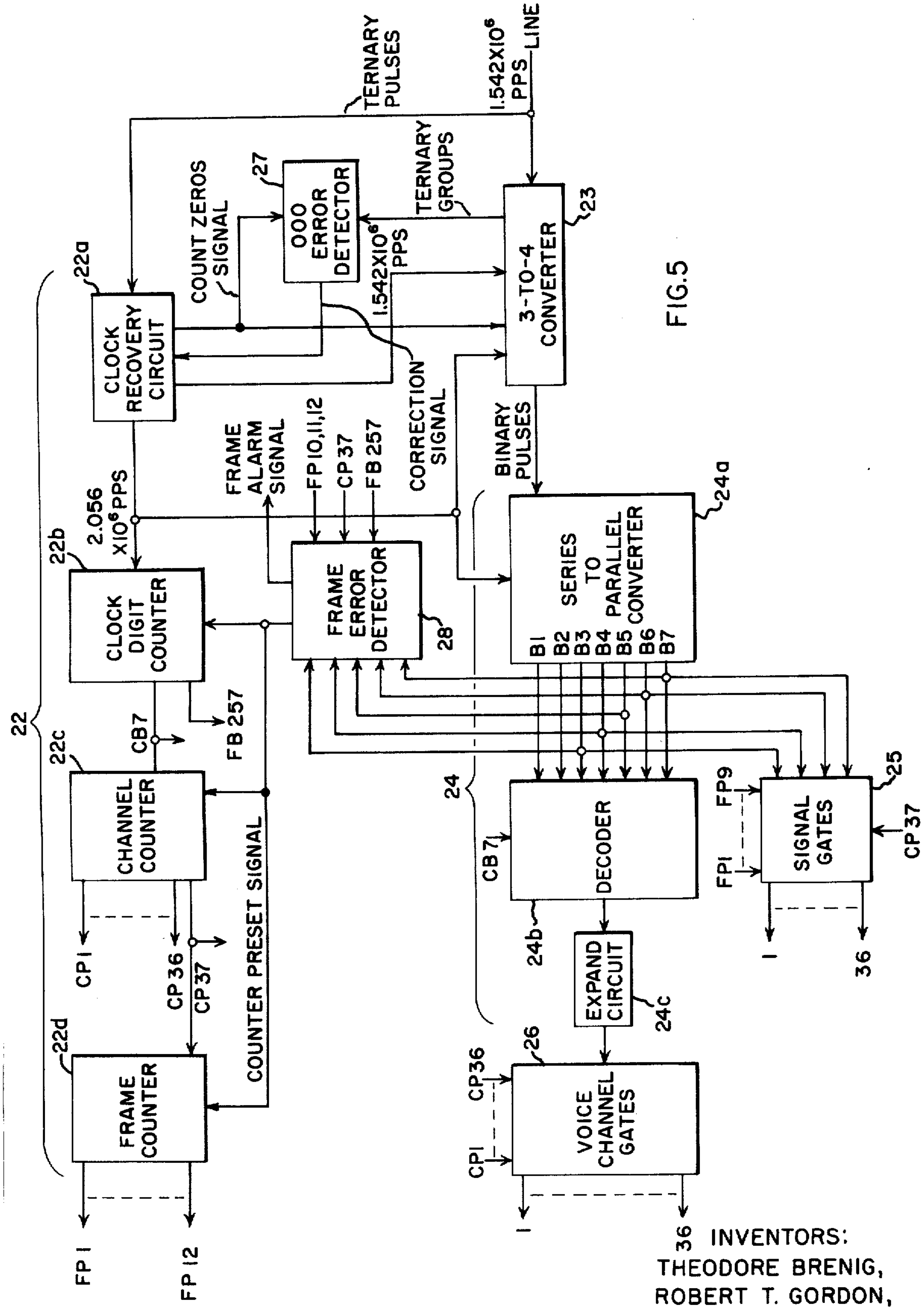
FIG. 5 shows a more detailed block diagram of the time-division multiplex, pulse-code modulation receiver of FIG. 1.

In FIG. 5, we show a more detailed block diagram of a time-division multiplex, pulse-code modulation receiver in accordance with our invention for receiving, decoding, and demultiplexing signals from a transmitter such as shown in FIG. 4. In FIG. 5, the blocks corresponding to those shown in FIG. 1 have the same reference numerals. The incoming ternary pulses, at a rate of 1.542 million pulses per second, are applied to the timing circuits 22 and to the 3-to-4 converter 23. The timing circuits 22 actually comprise four separate or distinct circuits. The first circuit is a clock recovery circuit 22*a* which regenerates two stable pulse trains of 1.542 and 2.056 million pulses per second (hereinafter sometimes referred to as the 1.542 and 2.056 pulses) from the incoming ternary pulses. The 2.056 pulses are applied to a clock digit counter 22*b* which counts these pulses in sequence, and produces timing channel bit CB-7 to represent each seventh channel bit pulse, and produces timing frame bit FB-257 to represent each 257th frame bit pulse. The timing channel bit CB-7 is applied to a channel counter 22*c* which counts the CB-7 bits and produces channel pulses CP-1 through Cp-37 in sequence and with a duration to correspond with the channel times shown in FIG. 2. Each channel pulse CP-37 is applied to a frame counter 22*d* which produces frame pulses FP-1 through FP-12 in sequence and with a duraiton of 257 frame bits to correspond with the frame times shown in FIG. 2. Thus, the timing circuits 22 produce all of the needed timing signals from the incoming ternary pulses. The incoming ternary pulses are also applied to the 3-to-4 converter 23 which groups the pulses in the proper groups of three (i.e., as grouped at the distant transmitter), and with the 1.542 and 2.056 clock pulses and logic circuits, converts each of these ternary groups to a group of four sequential binary pulses in accordance with the code in FIG. 3. The proper grouping of the ternary pulses is provided by an 000 error detector 27 which looks at each group of ternary pulses in response to a count-zeros signal from the clock recovery circuit 22*a*. As shown in FIG. 3, the ternary codes which are used do not have three consecutive zeros. If three zeros are detected in a group, the detector 27 provides a correction signal that causes the clock recovery circuit 22*a* to skip one clock count, and that causes the 3-to-4 data converter 23 to shift the grouping by one ternary pulse. If a ternary group of three zeros is again detected, another correction or shift is made. Since the ternary groups contain only three pulses, a maximum of two corrections or shifts are required, and one correction may provide the correct grouping. Three consecutive zeros were omitted from the ternary code for several reasons, namely the fact that sequences of three zeros make it relatively difficult to reconstruct the clock signals, and the fact that three consecutive zeros can be used to indicate an error.

The binary pulses from the converter 23 are applied to the decoder and expand circuits 24, which actually include three circuits. The first is a series to parallel converter 24*a* which receives binary pulses in sequence and places them in a 7-bit shift register. The 7 bits are indicated as B-1 through B-7 and at the appropriate time, all 7 bits are simultaneously but separately shifted into a decoder 24*b* by the channel bit CB-7. After each 7 bits B-1 through B-7 are shifted out of the converter 24*a*, more binary pulses are sequentially applied to the shift register in the converter 24*a*. The 7 bits simultaneously applied to the decoder 24*b* will, if the receiver is in frame or synchronization, have the same binary makeup as the corresponding seven pulses which encoded an amplitude pulse. These 7 bits are converted to a single signal whose amplitude corresponds to the binary makeup of the 7 bits. This single signal is then applied to an expand circuit 24*c*. The expand circuit 24*c* decreases the gain of the lower amplitude signals (by the same amount that the gain was increased by the transmitter compressor) so as to faithfully reconstruct the original voice signal. These voice signals are then applied to the voice channel gates 26, which, in response to the channel pulses CP-1 through CP-36, respectively gate the voice signals to the respective channels 1 through 36. The gates 26 may include hold circuits for each channel to provide a continuous voice signal from each gated signal until the succeeding gated signal is supplied (0.125 milliseconds later).

Bits B-3 through B-7 (corresponding to the 5 channel bits CB-1 through CB-5 in channel 37) are also applied to a frame error detector 28. The frame error detector 28 compares these five bits or digits in frames 10, 11, and 12 during the time of channel 37, and if the binary sequence of 1 0 1 1 0 does not appear in channel 37 of frame 10, or if the binary sequence of 0 0 0 0 0 does not appear in channel 37 of frame 11, or if the binary sequence of 1 0 1 1 0 does not appear in channel 37 of frame 12, the error detector 28 produces a counter preset signal which causes the clock digit counter 22*b*, the channel counter 22*c*, and the frame counter 22*d* to correct their count until these three binary sequences do appear in channel 37 of frames 10, 11, and 12. A random or one-kind error in transmission of the binary framing sequence is ignored by the error-detector 28.

Signalling information is derived from bits B-3, B-4, B-6, and B-7 (corresponding to channel bits CB-1, CB-2, CB-4, and CB-5) during channel 37 of frames 1 through 9, and this informatin is applied to the signal gates 25. The signal gates 25 supply this information to the proper channels 1 through 36 at times directed by frame pulses FP-1 through FP-9, and by channel pulse CP-37. As mentioned earlier, only one signalling pulse is provided for each channel during a super frame, but this is sufficient, since one super frame occurs during each 1.5 millisecond. This is ample for signalling, as typical telephone dialing signals last on the order of 40 milliseconds or longer.

SYSTEM OPERATION

Figure 6:
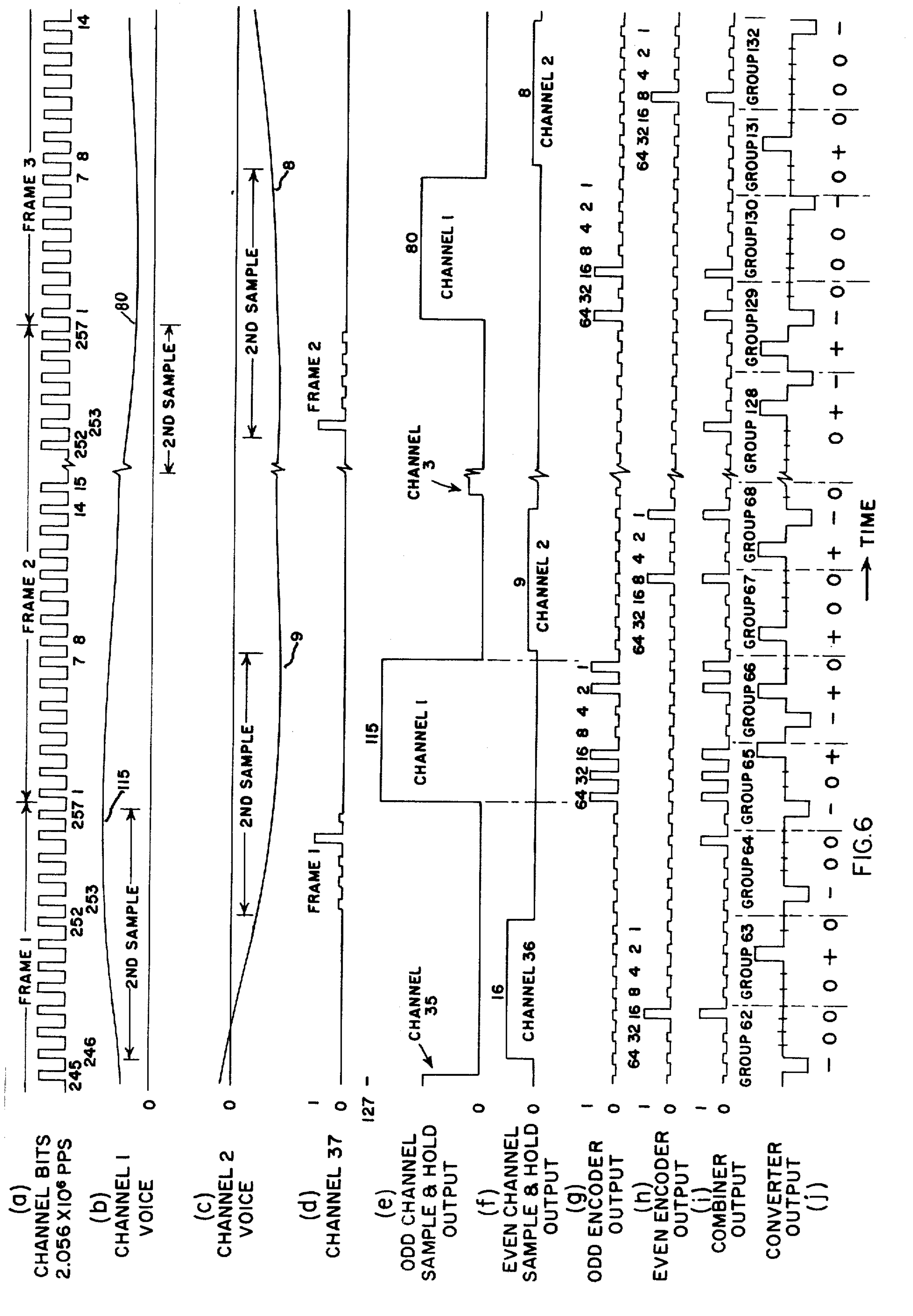
FIG. 6 shows waveforms illustrating the operation of a time-division multiplex, pulse-code modulation system in accordance with our invention.

In FIG. 6, we show waveforms illustrating the operation (during three frames) of a time-division multiplex, pulse-code modulation system in accordance with our invention. The waveforms are plotted along a common time axis. FIG. 6(*a*) shows channel bits which occur at the rate of 2.056 million pulses per second. These bits are numbered from 245 through 257 of frame 1; from 1 through 15, followed by a break indicating the lapse of time, and from 252 through 257 of frame 2; and from 1 through 14 of frame 3. FIGS. *b*) and 6(*c*) show examples of the voice signals on the voice channels 1 and 2 respectively, and FIG. 6(*d*) shows the signals in Frames 1 and 2 of Channel 37.

Since we prefer to group the odd channels together and the even channels together, additional time is available for gating and sampling. The first sample for a voice channel can be taken during the two immediately preceding voice channels and channel 37 if it intervenes. The second sample can be taken from the first sample during the one immediately preceding voice channel and channel 37 if it intervenes. Thus, for example, the first sample of voice channel 1 is taken during the time of channels 35, 36, and 37; and the second sample of voice channel 1 is taken during time of channels 36 and 37. The first sample of voice channel 2 is taken during the time of channels 36, 37, and 1; and the second sample of voice channel 2 is taken during the time of channels 37 and 1. However, the first sample of voice channel 3 is taken during the time of channels 1 and 2; and the second sample of voice channel 3 is taken during the time of channel 2. The samples of channels 4 through 36 are taken at times comparable to channel 3. As shown in FIG. 6(*b*), the voice signal of Channel 1 has an assumed amplitude of 115 when sampled. As shown in FIG. 6(*e*), the odd-channel, sample-and-hold output for channel 1 is held at this level of 115 for seven bits (approximately bits 1 through 7). In frame 2, the voice signal of channel 1 has an assumed amplitude of 80 when it is sampled, and as shown in the odd-channel sample-and-hold output waveform for frame 2, channel 1, is held at a level of 80. The odd-channel sample-and-hold output also shows channel 35 (at the point in time it precedes channel 1), and also shows the beginning of channel 3 (with the time break) at the point in time it occurs following channel 1. In FIG. 6(*c*), it is assumed that channel 2 has an amplitude of 9 when sampled in frame 2 and an amplitude of 8 when sampled in frame 3. This is indicated in the even channel sample-and-hold output waveform of FIG. 6(*f*) where levels of 9 and 8 are held for channel 2 during the appropriate times. The even channel sample-and-hold output waveforms also shows channel 36 (ahead of channel 2) with an assumed level of 16 when sampled and held.

In FIG. 6(*d*), the pulses for channel 37 are shown for frames 1 and 2 at the time of occurrence, namely frame bits FB-253 through FB-257. In this explanation of channel 37, the channel makeup shown in FIG. 2 should be referred to. During frame 1, it is assumed that channels 1 and 2 have no signalling; hence, the first two pulses are at 0. At this point, it should be noted that small amplitude pulses (representing a 0) are shown to indicate when these pulses would appear, although in actual practice, these pulses would have no amplitude for a 0. The third pulse is also at 0, since it is assumed that the system is in frame, and no alarm pulse is needed. The fourth pulse is at 1, indicating the presence of signalling on channel 3. The fifth pulse is at 0 indicating the absence of signalling on channel 4. During frame 2, it is assumed that signalling is present on channel 5, so that the first pulse is at 1. It is also assumed that there is no signalling in channel 6, that the system is still in frame, and that there is no signalling in channel 7 and 8 of frame 2, so that the corresponding signals are at 0.

In the odd encoder output waveform of FIG. 6(*g*), we show the pulses produced by the encoder to indicate the sampled levels for the odd channels. FIG. 6(*h*) shows the encoder pulses for the sampled levels of the even channels. Thus, for the level of 115 in channel 1 of frame 2, 1's are produced for the indicated weights of 64, 32, 16, 2 and 1 (this being a total of 115). But no pulses (i.e., 0's) are provided for the indicated weights of 8 and 4 (although short pulses are shown to indicate their appearance in time). For the level of 80 in channel 1 of frame 3, 1's are produced for the indicated weights of 64 and 16 (totalling 80), and 0's are shown for the weights of 32, 8, 4, 2, and 1. In a similar manner in FIG. 6(*h*), the even encoder outputs have a 1 for the weight of 16 for channel 36 of frame 1; 1's for the weights of 8 and 1 for channel 2 of frame 2; and 1 for the weight of 8 for channel 2 of frame 3.

The pulses from channel 37, the odd encoder output, and the even encoder output are combined in the combiner output waveform of FIG. 6(*i*). This waveform shows 1's at the corresponding times whenever the 1's occur in the waveforms of FIGS. 6(*d*), 6(*g*), and 6(*h*) to provide a combined output for the 1's and 0's of the even and odd voice channels and the channel 37. Just below the waveform of FIG. 6(*i*), we have shown separation lines for grouping the pulses in groups of 4 pulses or bits. The groups are numbered beginning with group 62, since the first pulse is numbered 245, and pulse 244 is the last pulse of group 61 (244 divided by 4). The groups are numbered consecutively through group 68 (which ends with pulse 15 of frame 2), followed by the time break and resuming with group 128 (which begins with pulse 252 of frame 2 after the passage of 236 pulses or 59 groups), and continuing consecutively through group 132. And finally, we show the converter output in FIG. 6(*j*) with the ternary pulses in the same groups. Again with reference to the conversion code shown in FIG. 3, group 62 (three 0's and a 1) is converted to − 0 0 (using the negative mode since it is assumed that the net polarity weight is 0). Group 63 with four 0's is converted with the positive mode (since the previous mode had a net negative polarity weight of minus 1) to 0 + 0. In a similar manner, the other groups are converted to the ternary pulses shown in the waveform of FIG. 6(*j*).

At the receiver, the reverse process takes place, and the incoming ternary signals are converted back to binary signals, decoded, expanded, and gated to their corresponding voice channels.

CONCLUSION

It will thus be seen that we provide a new and improved time-division multiplex, pulse-code modulation system. The 36 channels provided by our system are primarily the result of the 36 voice channels having no signalling, alarm, or framing; providing an additional 37th channel for such signalling, alarm, and framing; and using a binary-to-ternary code conversion to reduce the line pulse rate. We have tried out our system experimentally, and have found that it operates satisfactorily, with relatively little cross-talk and noise, and the relatively high-quality voice circuits. While we have discussed only one embodiment of our system, persons skilled in the art will appreciate that our system can carry other information or intelligence besides voice conversations. Likewise, various logic arrangements and circuits can be used to provide the functions indicated in the block diagrams. And finally, if additional signalling is needed for the 36 voice channels (such as in some private exchanges), this can be provided by using the least significant bit (channel bit CB-7) of the voice channels in frame 12 without appreciable degradation of voice channel quality. Therefore, while our invention has been described with reference to a particular embodiment, it is to be understood that modifications may be made without departing from the spirit of the invention or from the scope of the claims.

What we claim as new and desire to secure by Letters Patent of the United States is:

1. An improved time-division multiplex, pulse-code modulation transmitter for a plurality of channels, each having information and signalling, said transmitter comprising:

a. means for repetitively sampling the information in each of said channels in a selected order, one sample from each of said channels comprising a frame;

b. means coupled to said sampling means for encoding each of said samples as binary pulses in said selected order, the sequence of binary pulses encoding one sample from each of said channels also comprising a frame;

c. means for repetitively indicating the presence or absence of signalling in each of said channels in a selected order;

d. means coupled to said encoding means and to said signal indicating means for combining a selected number of said signalling indications at one end of each of a selected number of frames of binary pulse sequences;

e. and means coupled to said combining means for converting each group of four binary pulses to a group of three ternary pulses in accordance with a selected code for transmission over a communications circuit.

2. The improved time-division multiplex, pulse-code modulation transmitter of claim 1 wherein said plurality of channels comprises 36, wherein said selected number of signalling indications comprises four, and wherein said selected number of frames comprises nine.

3. The improved time-division multiplex, pulse-code modulation transmitter of claim 1 wherein said encoding means encodes each of said samples as seven binary pulses.

4. The improved time-division multiplex, pulse-code modulation transmitter of claim 3 wherein said plurality of channels comprises 36, wherein said selected number of signalling indications comprises four, and wherein said selected number of frames comprises nine.

5. An improved time-division multiplex, pulse-code modulation receiver for receiving a plurality of information channels followed by one signalling channel, comprising:

a. means adapted to be coupled to a communications circuit for converting each group of three ternary pulses to a group of four binary pulses in accordance with a selected code;

b. means coupled to said converting means for repetitively storing a selected quantity of said binary pulses for simultaneous utilization;

c. first means coupled to said storing means for converting each selected quantity of stored binary pulses to an amplitude signal corresponding to the information represented by said stored binary pulses;

d. second means coupled to said storing means for converting selected ones of said stored binary pulses to a respective signalling signal;

e. means coupled to said first converting means for gating each of said amplitude signals to a respective information channel;

f. and means coupled to said second converting means for gating each of said signalling signals to a respective information channel.

6. The improved time-division multiplex, pulse-code modulation receiver of claim 5 wherein said plurality of information channels comprises 36.

7. The improved time-division multiplex, pulse-code modulation receiver of claim 5 wherein said selected quantity of binary pulses comprises seven.

8. The improved time-division multiplex, pulse-code modulation receiver of claim 7 wherein said plurality of information channels comprises 36.

9. An improved system for providing a plurality of communication channels over a common medium, comprising:

a. means for sampling the amplitude of information in each of the communication channels at a selected repetition rate;

b. means connected to said sampling means for repetitively time-division multiplexing each of said amplitude samples in a selected sequence, a sample from each of said communication channels forming part of a frame;

c. means connected to said multiplexing means for repetitively encoding the amplitude of each amplitude sample into a plurality of binary pulses, each of said pluralities of binary pulses representing the amplitude of its respective sample, and thereby form a pulse train of said binary pulses, a pulse train of said binary pulses representing each of said communication channels also forming said part of a frame;

d. means connected to said encoding means for combining a selected number of binary signalling and other pulses with said pulse trains after each of said parts of said frames to form complete frames of pulse trains;

e. and first converting means connected to said signal and other pulse combining means for converting each sequence of four binary pulses into a corresponding sequence of three ternary pulses having a lower pulse rate for application to a common communication medium.

10. The improved system of claim 9 wherein said plurality of communication channels comprises 36, wherein said plurality of binary pulses comprises seven, and wherein said selected number of signalling and other pulses comprises five.

11. The improved system of claim 10, and further comprising;

f. second converting means connected to said common communication medium for converting each sequence of three ternary pulses into a sequence of four binary pulses corresponding to the sequences of four binary pulses at said first converting means;

g. means connected to said second converting means for decoding each plurality of seven binary pulses into an amplitude signal corresponding to an amplitude sample at said encoding means;

h. means connected to said decoding means for gating each of said amplitude signals to a respective communication channel;

i. and means connected to said decoding means for gating each binary signalling pulse to a respective communication channel.

12. An improved method for transmitting a plurality of communication channels, each channel having information and signalling, over a common circuit, said method comprising:

a. taking an amplitude sample of the information in each channel at a selected rate greater than the highest frequency of information;

b. sequentially combining each of said amplitude samples in a selected order to form part of a frame;

c. converting said samples into part of a frame of coded binary pulses representing said amplitude samples;

d. inserting binary pulses representing signalling after each part of a frame of coded binary pulses;

e. and converting said coded binary pulses and signalling pulses into coded ternary pulses for transmission.

13. An improved communication system for transmitting N channels, each having main information and auxiliary information such as signalling, over a single communication circuit, comprising:

a. means for repetitively time-division multiplexing an amplitude sample of main information from each of said N channels in a sequence;

b. means connected to said multiplexing means for encoding each of said amplitude samples as a first plurality of sequential binary pulses;

c. one sequence of said binary pulses representing main information in each of said N channels forming a partial frame;

d. means for combining a second plurality of binary pulses representing auxiliary information with each of said sequences of binary pulses representing main information in each of said N channels;

e. one sequence of said binary pulses representing main information in each of said N channels and one sequence of said selected number of binary pulses representing auxiliary information forming a complete frame;

f. and means connected to said combining means for converting each group of four binary pulses to a corresponding group of three ternary pulses for transmission.

14. The improved communication system of claim 13 wherein said first plurality of binary pulses comprises seven pulses representing main information; and wherein said second plurality of binary pulses comprises five binary pulses representing auxiliary information.

15. The improved communication system of claim 14 wherein said N channels comprise 36 voice channels.

16. The improved communication system of claim 14 wherein twelve of said frames comprise a superframe, wherein said five binary pulses in nine of said 12 frames provide signalling and alarm information, and wherein said five binary pulses in three of said 12 frames provide framing information.

17. The improved communication system of claim 16 wherein said N channels comprise 36 voice channels.

18. The improved communication system of claim 14 wherein said multiplexing means and said encoding means comprises two paths, each of which multiplexes and encodes a portion of said channels so as to provide additional time for multiplexing and encoding.

19. The improved communication system of claim 18 wherein 12 of said frames comprise a superframe, wherein each of said five binary pulses in nine of said 12 frames provide four signalling pulses and one alarm pulse, and wherein said five binary pulses in three of said 12 frames provide framing signals.

20. The improved communication system of claim 14, and further comprising:

g. second means connected to said transmission converting means for converting each of said groups of three ternary pulses to a corresponding group of four binary pulses;

h. means connected to said second converting means for decoding groups of seven binary pulses and producing main information corresponding thereto and for decoding groups of five binary pulses and producing auxiliary information corresponding thereto;

i. and means connected to said decoding means for demultiplexing said main information and said auxiliary information to the proper channels.

* * * * *